United States Patent
Lee et al.

(10) Patent No.: US 11,115,452 B2
(45) Date of Patent: Sep. 7, 2021

(54) METHOD AND DEVICE FOR PROCESSING ENCODED VIDEO DATA, AND METHOD AND DEVICE FOR GENERATING ENCODED VIDEO DATA

(71) Applicant: SAMSUNG ELECTRONICS CO., LTD., Suwon-si (KR)

(72) Inventors: Tammy Lee, Seoul (KR); Seung-hoon Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/729,966

(22) Filed: Dec. 30, 2019

(65) Prior Publication Data

US 2020/0137135 A1    Apr. 30, 2020

Related U.S. Application Data

(62) Division of application No. 15/519,428, filed as application No. PCT/KR2015/010895 on Oct. 15, 2015, now Pat. No. 10,542,063.

(Continued)

(51) Int. Cl.
*H04L 29/06* (2006.01)
*H04N 21/2343* (2011.01)
(Continued)

(52) U.S. Cl.
CPC ............ *H04L 65/607* (2013.01); *H04L 29/06* (2013.01); *H04N 19/44* (2014.11); *H04N 19/46* (2014.11);
(Continued)

(58) Field of Classification Search
CPC ........ H04L 65/607; H04L 29/06; H04N 19/44
See application file for complete search history.

(56) References Cited

U.S. PATENT DOCUMENTS

| 8,194,997 B2 | 6/2012 | Segall et al. |
| 9,706,227 B2 | 7/2017 | Chen et al. |

(Continued)

FOREIGN PATENT DOCUMENTS

| CN | 103430542 A | 12/2013 |
| CN | 103907347 A | 7/2014 |

(Continued)

OTHER PUBLICATIONS

Communication dated Apr. 13, 2020 issued by the State Intellectual Property Office of P.R. China in counterpart Chinese Application No. 201580065983.X.

(Continued)

*Primary Examiner* — Shawn S An
(74) *Attorney, Agent, or Firm* — Sughrue Mion, PLLC

(57) ABSTRACT

Disclosed are a coded video data processing method and apparatus which consider a random access, and a coded video data generating method and apparatus which consider a random access. The coded video data processing method includes obtaining a bitstream of coded video data, obtaining metadata information used for video-processing of pictures having a decoding order after a random access point picture in the bitstream, and performing video-processing on decoded video data among the pictures having the decoding order after the random access point picture, based on the metadata information.

9 Claims, 10 Drawing Sheets

Related U.S. Application Data

(60) Provisional application No. 62/077,471, filed on Nov. 10, 2014, provisional application No. 62/064,557, filed on Oct. 16, 2014.

(51) Int. Cl.
  *H04N 19/46* (2014.01)
  *H04N 19/87* (2014.01)
  *H04N 19/70* (2014.01)
  *H04N 19/44* (2014.01)

(52) U.S. Cl.
  CPC .............. *H04N 19/70* (2014.11); *H04N 19/87* (2014.11); *H04N 21/2343* (2013.01)

(56) References Cited

U.S. PATENT DOCUMENTS

| | | | |
|---|---|---|---|
| 2003/0163477 A1* | 8/2003 | Visharam | H04N 21/8451 |
| 2009/0232220 A1 | 9/2009 | Neff et al. | |
| 2010/0189182 A1* | 7/2010 | Hannuksela | H04N 19/44 |
| | | | 375/240.25 |
| 2012/0230433 A1* | 9/2012 | Chen | H04N 19/70 |
| | | | 375/240.25 |
| 2013/0170561 A1* | 7/2013 | Hannuksela | H04N 19/159 |
| | | | 375/240.25 |
| 2013/0272430 A1 | 10/2013 | Sullivan et al. | |
| 2013/0294500 A1 | 11/2013 | Wang | |
| 2014/0168362 A1 | 6/2014 | Hannuksela et al. | |
| 2014/0301486 A1* | 10/2014 | Liao | H04N 19/87 |
| | | | 375/240.27 |
| 2016/0100196 A1 | 4/2016 | Wu et al. | |
| 2016/0142714 A1* | 5/2016 | Toma | H04N 21/4621 |
| | | | 375/240.25 |
| 2016/0165248 A1* | 6/2016 | Lainema | H04N 19/107 |
| | | | 375/240.08 |
| 2019/0222863 A1 | 7/2019 | Hannuksela et al. | |

FOREIGN PATENT DOCUMENTS

| | | |
|---|---|---|
| KR | 10-2011-0106465 A | 9/2011 |
| KR | 10-2013-0129468 A | 11/2013 |

OTHER PUBLICATIONS

Ye-Kui Wang et al., "Signaling of Shot Changes", Joint Video Team (JVT) of ISO/IEC MPEG & ITU-T VCEG (ISO/IEC JTC1/SC29/WG11 and ITU-T SG16 Q.6) Meeting: Klagenfurt, Austria, Jul. 22-26, 2002, Document: JVT-D099 Filename: JVT-D099.doc 4th.

International Search Report and Written Opinion (PCT/ISA/210/220/237) dated Feb. 17, 2016 issued by the International Searching Authority in counterpart International Application PCT/KR2015/010895.

Hendry et al., "Undiscardable Leading Pictures for CRA", Joint Collaborative Team on Video Coding (JCT-VC) of ITU-T SG16 WP3 and ISO/IEC JTC1/SC29/WG11,7$^{th}$ Meeting: Geneva, CH, Nov. 21-30, 2011, Document: JCTVC-G158, (7 pages total).

Communication dated Jul. 25, 2017, from the European Patent Office in counterpart European Application No. 15850349.0.

Communication dated Jun. 4, 2019 issued by the State Intellectual Property Office of P.R. China in counterpart Chinese Application No. 201580065983.X.

Wang et al., "Signaling of Shot Changes", Joint Video Team (JVT) of ISO/IEC MPEG & ITU-T VCEG (ISO/IEC JTC1/SC29/WG11 and ITU-T SG16 Q.6), Jul. 2002, 14 pages total.

Yin Zhao et al., "MVC+D: Enhanced 3DVC reference displays information SEI message", Joint Collaborative Team on 3D Video Coding Extension Development of ITU-T SG 16 WP 3 and ISO/IEC JTC 1/SC 29/WG 11, 2nd Meeting: Shanghai, CN, Oct. 13-19, 2012, Document: JCT3VB0178r2, (8 Pages Total).

Communication dated Aug. 19, 2020, issued by the India Intellectual Property Office in counterpart Indian Patent Application No. 201727014542.

Communication dated May 23, 2021, issued by the Korean Intellectual Property Office in Korean Application No. 10-2017-7010438.

* cited by examiner

FIG. 5A

| meta_data_info( payloadSize ) { | Descriptor |
|---|---|
|   meta_data_id | ue(v) |
|   meta_data_info_present_flag | u(1) |
|   if(meta_data_info_present_flag ) { | |
|     meta data here | |
|   } | |
| } | |

FIG. 5B

| meta_data_info( payloadSize ) { | Descriptor |
|---|---|
|   meta_data_id | ue(v) |
|   meta data here | |
| } | |

| meta_data_pointer( payloadSize ) { | Descriptor |
|---|---|
|   meta_data_id | ue(v) |
| } | |

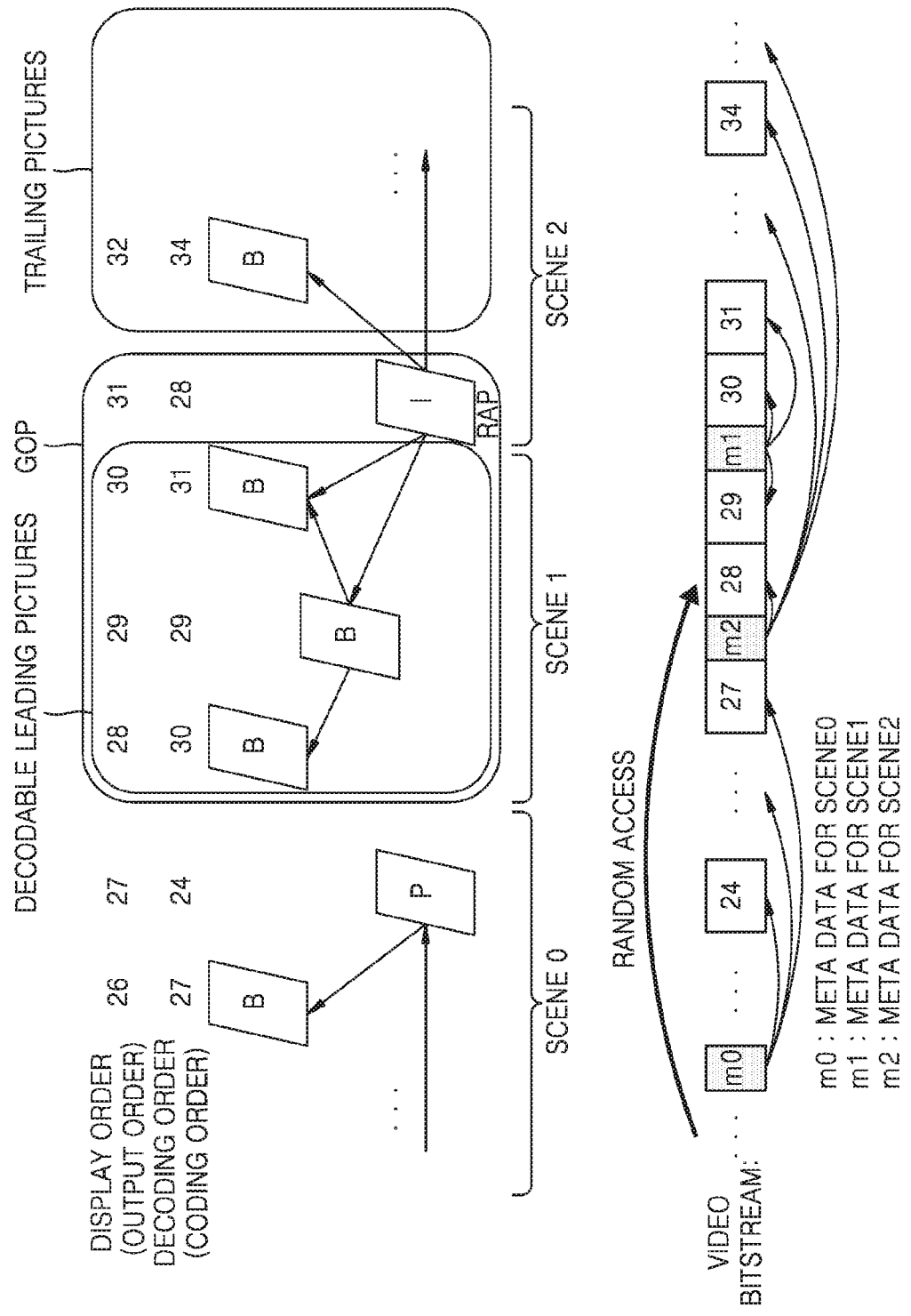

METHOD AND DEVICE FOR PROCESSING ENCODED VIDEO DATA, AND METHOD AND DEVICE FOR GENERATING ENCODED VIDEO DATA

CROSS REFERENCE TO RELATED APPLICATIONS

This application is a divisional of U.S. application Ser. No. 15/519,428 filed Apr. 14, 2017, which is a National State of PCT/KR2015/010895 filed Oct. 15, 2015, which claims priority from Provisional Application Nos. 62/077,471 filed Nov. 10, 2014 and 62/064,557, filed Oct. 16, 2014, the contents of all of which are incorporated herein by reference in their entirety.

TECHNICAL FIELD

The present invention relates to a coded video data processing method and apparatus, and a coded video data generating method and apparatus.

BACKGROUND ART

Since hardware capable of reproducing and storing high-resolution or high-quality video contents have been developed and popularized, a video codec capable of efficiently coding or decoding high-resolution or high-quality video contents is in high demand. A typical video codec codes video using limited coding schemes based on tree-structure coding units.

Video data of the spatial domain is transformed into coefficients of the frequency domain by using frequency transformation. The video codec splits an image into predetermined-sized blocks for fast frequency transformation, and performs discrete cosine transformation (DCT) on each block to code block-unit frequency coefficients. To remove redundancy between color images, typical compression systems perform block-based prediction. The typical compression systems generate parameters used for video coding and decoding, in units of pictures.

DETAILED DESCRIPTION OF THE INVENTION

Technical Problem

The present invention provides a coded video data processing method and apparatus which consider a random access, and a coded video data generating method and apparatus which consider a random access. Additional aspects will be set forth in part in the description which follows and, in part, will be apparent from the description, or may be learned by practice of the presented embodiments.

Technical Solution

According to an aspect of an embodiment, a coded video data processing method includes obtaining a bitstream of coded video data, obtaining metadata information used for video-processing of pictures having a decoding order after a random access point picture in the bitstream, and performing video-processing on decoded video data among the pictures having the decoding order after the random access point picture, based on the metadata information.

The obtaining of the metadata information may include obtaining metadata identification information corresponding to the metadata information from a predetermined location in the bitstream, and obtaining the metadata information mapped to the obtained metadata identification information, from a metadata information database.

The coded video data processing method may further include obtaining the metadata information database via a channel different from a channel via which the bitstream is obtained.

The obtaining of the metadata information may include obtaining the metadata information based on a location of the random access point picture in the bitstream and a location of a scene cut of a scene including one or more pictures having a decoding order after the random access point picture.

The obtaining of the metadata information may include, if the random access point picture and decodable leading pictures belong to a same scene, obtaining metadata information of the scene to which the random access point picture and the decodable leading pictures belong, based on a location of a first decodable leading picture in a display order.

The obtaining of the metadata information may include, if the random access point picture and decodable leading pictures belong to different scenes, obtaining metadata information of the scene to which the random access point picture belongs and metadata information of the scene to which the decodable leading pictures belong, based on a location of the random access point picture and a location of a first decodable leading picture in a display order.

The location of the scene cut may correspond to a location of a first picture in a display order among pictures belonging to each scene.

According to another aspect of an embodiment, a coded video data generating method includes coding video data, generating metadata information used for video-processing of pictures having a decoding order after a random access point picture, and generating a bitstream of the coded video data, the bitstream including the metadata information or metadata identification information corresponding to the metadata information.

The generating of the bitstream may include generating the bitstream by inserting the metadata identification information into a predetermined location in the bitstream.

The coded video data generating method may further include transmitting the bitstream including the metadata identification information, and a metadata information database including the generated metadata information, via different channels.

The generating of the bitstream may include generating the bitstream by inserting the metadata information into a location of the random access point picture and a location of a scene cut of a scene including one or more pictures having a decoding order after the random access point picture.

The generating of the bitstream may include, if the random access point picture and decodable leading pictures belong to a same scene, generating the bitstream by inserting metadata information of the scene to which the random access point picture and the decodable leading pictures belong, into a location of a first decodable leading picture in a display order.

The generating of the bitstream may include, if the random access point picture and decodable leading pictures belong to different scenes, generating the bitstream by inserting metadata information of the scene to which the random access point picture belongs, into a location of the random access point picture, and inserting metadata information of the scene to which the decodable leading pictures belong, into a location of a first decodable leading picture in a display order.

The location of the scene cut may correspond to a location of a first picture in a display order among pictures belonging to each scene.

According to another aspect of an embodiment, a non-transitory computer-readable recording medium has recorded thereon a computer program for executing the coded video data processing method or the coded video data generating method.

According to another aspect of an embodiment, a video data processing apparatus includes a bitstream obtainer for obtaining a bitstream of coded video data, a video decoder for decoding the bitstream, and a video processor for obtaining metadata information used for video-processing of pictures having a decoding order after a random access point picture in the bitstream, and performing video-processing on the decoded video data among the pictures having the decoding order after the random access point picture, based on the metadata information.

The video processor may obtain metadata identification information corresponding to the metadata information from a predetermined location in the bitstream, and obtain the metadata information mapped to the obtained metadata identification information, from a metadata information database.

The video processor may obtain the metadata information based on a location of the random access point picture in the bitstream and a location of a scene cut of a scene including one or more pictures having a decoding order after the random access point picture.

According to another aspect of an embodiment, a video data generating apparatus includes a video coder for coding video data and generating metadata information used for video-processing of pictures having a decoding order after a random access point picture, and a bitstream generator for generating a bitstream of the coded video data, the bitstream including the metadata information or metadata identification information corresponding to the metadata information.

The bitstream generator may generate the bitstream by inserting the metadata information into a location of the random access point picture and a location of a scene cut of a scene including one or more pictures having a decoding order after the random access point picture.

Advantageous Effects of the Invention

A video bitstream may be appropriately processed even when a random access has occurred.

DESCRIPTION OF THE DRAWINGS

FIGS. 5A and 5B are tables showing message formats for transmitting metadata identification information.

FIG. 6A is a schematic diagram for describing a method of generating and processing a bitstream of coded video data in consideration of an optimal location of metadata information in the video bitstream, according to an embodiment.

BEST MODE

According to an aspect of an embodiment, a coded video data processing method includes obtaining a bitstream of coded video data, obtaining metadata information used for video-processing of pictures having a decoding order after a random access point picture in the bitstream, and performing video-processing on decoded video data among the pictures having the decoding order after the random access point picture, based on the metadata information.

Mode of the Invention

Hereinafter, the present invention will be described in detail by explaining embodiments of the invention with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art.

It will be understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It will be further understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section.

In the following description, features well-known to one of ordinary skill in the art will not be described in detail.

Figure 1:
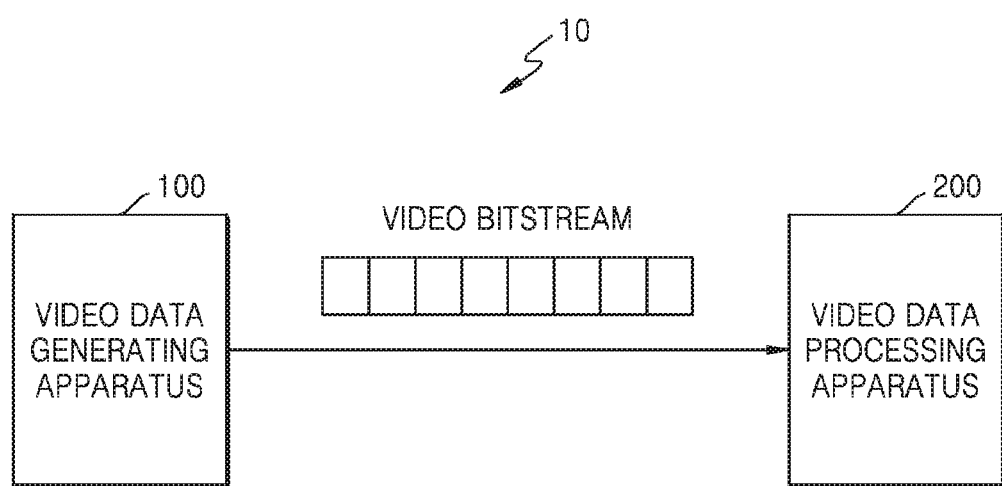
FIG. 1 is a block diagram of a video data processing system.

FIG. 1 is a block diagram of a video data processing system 10.

Referring to FIG. 1, the video data processing system 10 may include a video data generating apparatus 100 and a video data processing apparatus 200.

The video data generating apparatus 100 may be a video coding apparatus. The video data generating apparatus 100 may generate coded video data by coding input video, i.e., video data.

The video data processing apparatus 200 may be a video decoding apparatus. The video data processing apparatus 200 may generate decoded video data by decoding the coded video data.

The video data generating apparatus 100 may transmit a bitstream of the coded video data (hereinafter referred to as a video bitstream) to the video data processing apparatus 200, and the video data processing apparatus 200 may receive the video bitstream.

Figure 2A:
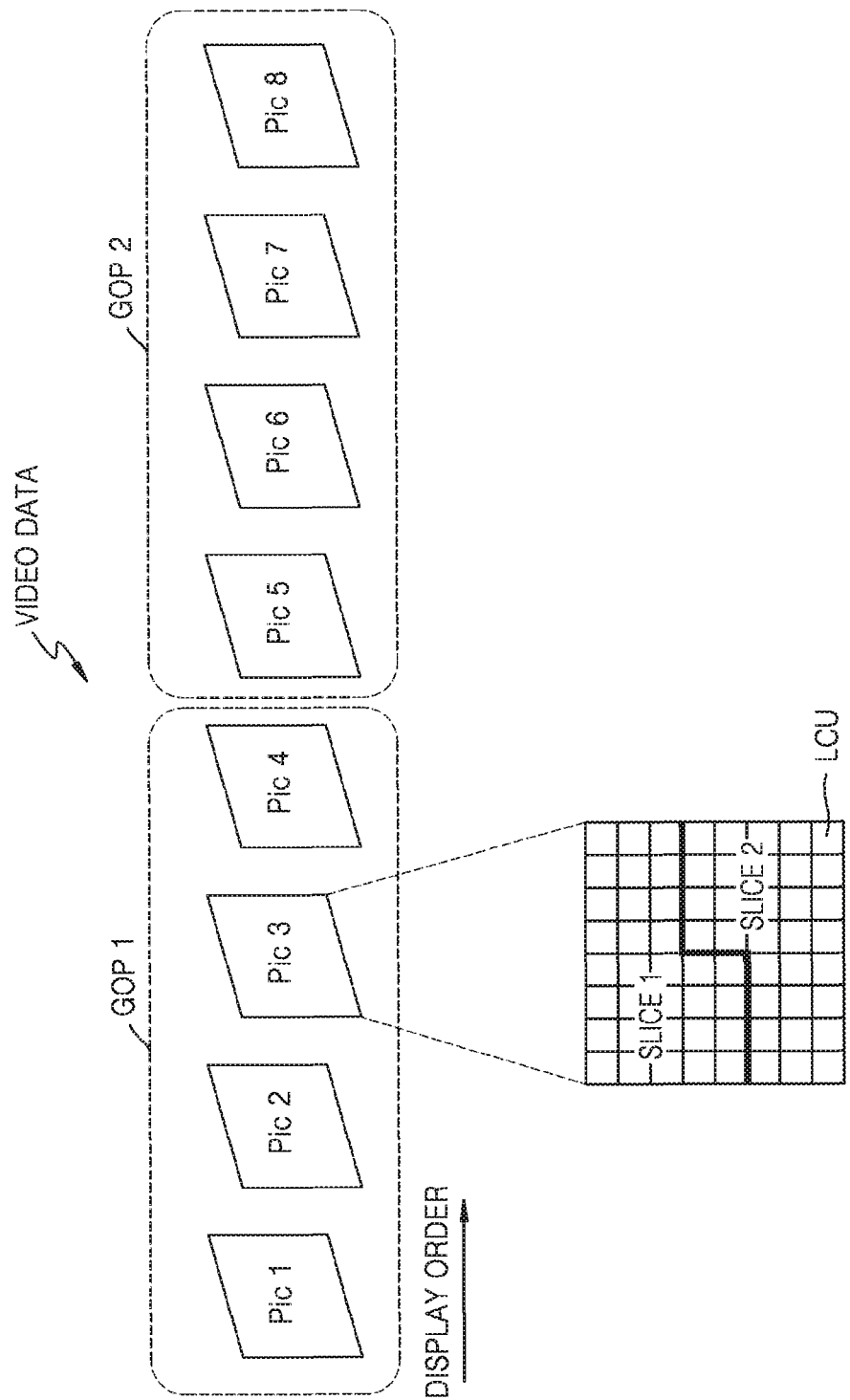
FIG. 2A is a schematic diagram for describing video data.

FIG. 2A is a schematic diagram for describing video data.

The video data is a sequence of video frames, i.e., pictures. The video data is called a video sequence.

A group of pictures (GOP) refers to a sequence of one or more pictures among pictures arranged in a display order.

A picture is a sequence of video blocks, i.e., largest coding units (LCUs) or coding tree units (CTUs). A video block may have a luminance component and a chroma component.

A video coding apparatus may divide a picture into a plurality of slices. In this case, each slice may be an I slice, a P slice, or a B slice. The I slice refers to a slice predicted using an intra prediction mode, the P slice refers to a slice predicted using an inter prediction mode, and the B slice refers to a slice predicted using a bi-directional inter prediction mode.

Referring to FIG. 2A, the video data includes a plurality of pictures from a first picture to an eighth picture. The pictures included in the video data may be sequential pictures arranged in a display order. The pictures from the first picture to the fourth picture belong to a first GOP, and the pictures from the fifth picture to the eighth picture belong to a second GOP.

An arbitrary picture may be divided into a plurality of slices, and each slice may include a plurality of video blocks. Referring to FIG. 2A, the third picture may be divided into a first slice and a second slice, and each slice may include a plurality of video blocks, i.e., LCUs.

For video coding, each of the video data, the GOPs, the pictures, the slices, and coding units (CUs) may be associated with syntax data indicating video coding attributes. A video decoding apparatus may use the syntax data to decode the video data. The syntax data is a syntax structure including syntax elements, and may be regarded as a parameter set. For example, the high efficiency video coding (HEVC) standard defines parameter sets such as a video parameter set (VPS), a sequence parameter set (SPS), a picture parameter set (PPS), and an adaptive parameter set (APS).

Figure 2B:
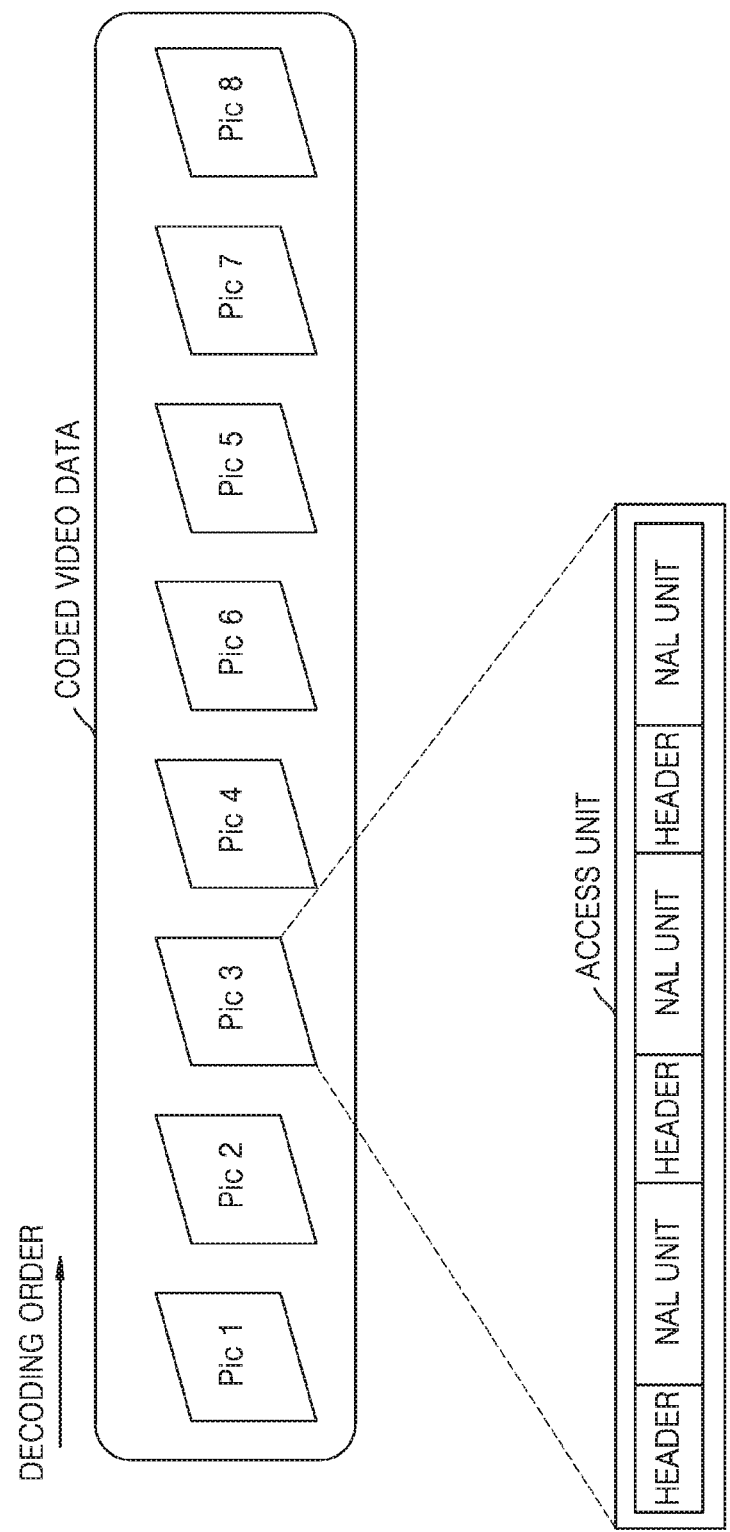
FIG. 2B is a schematic diagram for describing coded video data.

FIG. 2B is a schematic diagram for describing coded video data.

The coded video data is a sequence of pictures arranged in a decoding order or a coding order. The coded video data is also called a coded video sequence.

Referring to FIG. 2B, the coded video data may include a plurality of pictures from a first picture to an eighth picture. The pictures included in the coded video data may be sequential pictures arranged in a decoding order. That is, since the coded video data is a sequence of pictures arranged not in a display order but in a decoding order, as illustrated in FIG. 2B, orders of the fifth picture and the sixth picture may differ from the orders of the fifth picture and the sixth picture in the video data of FIG. 2A. In other words, the sixth picture may be decoded before the fifth picture.

Referring to FIG. 2B, an arbitrary picture may correspond to an access unit. The access unit may include a plurality of network abstraction layer (NAL) units, and include a coded picture. The NAL units may be divided into video coding layer (VCL) NAL units and non-VCL NAL units. The VCL NAL units may include data of slices included in one picture of video data. The non-VCL units may include information other than the data of the slices, e.g., a parameter set.

Referring to FIG. 2B, the third picture is configured as a sequence of headers and NAL units. Accordingly, a bitstream of the coded video data, i.e., a video bitstream, may be regarded as a sequence of a plurality of access units and, more particularly, a sequence of a plurality of NAL units arranged in a decoding order.

The video data generating apparatus 100 according to an embodiment of the present invention may include metadata information in the video bitstream. The video data processing apparatus 200 according to an embodiment of the present invention may obtain the metadata information from the video bitstream, and perform a video process for display, on decoded video data. The metadata information is information used for a video process, and refers to data capable of increasing video quality and applicable to the decoded video data to correspond to original video. For example, the metadata information may be information about a scene, e.g., information about a scene cut, scene classification, a color space of contents, or a color volume.

Each piece of the metadata information may include identification information. When two pieces of the metadata information having the same identification information are transmitted, the currently transmitted metadata information may partially update or entirely replace the previously transmitted metadata information. The metadata information may include information for cancelling the previously transmitted metadata information. The metadata information may include information about how long the metadata information is to be applied. The metadata information may include one or more parameters including predetermined values or conditions applicable when the metadata information is used for a video process.

The metadata information may be included in a supplemental enhancement information (SEI) message or a SEI NAL unit, and thus inserted into the video bitstream. The metadata information may be inserted into a starting part of each scene, and applied to a video process corresponding to a plurality of pictures included in the scene. In this case, when a random access has occurred in a part other than a starting part of any scene, since the metadata information of the scene is not present, video quality may be reduced.

To prevent loss of metadata information of each scene even when a random access has occurred, the metadata information of a scene to which each picture belongs may be included in the locations of all pictures included in the video bitstream. However, this method may cause overhead in terms of a bitrate. Alternatively, the metadata information of each picture included in the received video bitstream may be checked and stored in memory by analyzing every part of the video bitstream, and used for a video process. However, this method is not easily applicable to real-time streaming, but is applicable only when the video bitstream is completely received.

A description is now given of a method of generating and processing a video bitstream including metadata information, in consideration of a case where a random access has occurred.

Figure 3A:
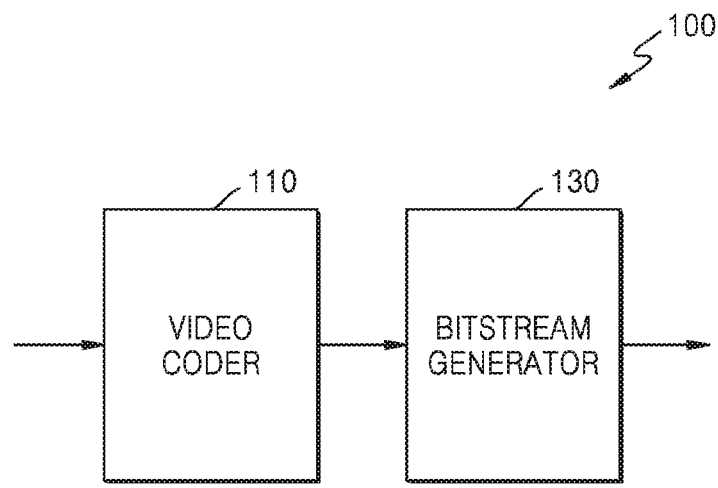
FIG. 3A is a block diagram of a video data generating apparatus according to an embodiment.

FIG. 3A is a block diagram of the video data generating apparatus 100 according to an embodiment. It will be understood by one of ordinary skill in the art that the video data generating apparatus 100 may include general-use hardware elements in addition to elements illustrated in FIG. 3A.

Referring to FIG. 3A, the video data generating apparatus 100 may include a video coder 110 and a bitstream generator 130.

The video coder 110 may code video data. The video coder 110 may generate coded video data in a coding order by coding video input to the video data generating apparatus 100.

The video coder 110 may generate metadata information applicable to decoded video data when the coded video data is decoded and then video-processed by the video data processing apparatus 200. The metadata information may be prepared in such a manner that pictures having a decoding order after a random access point may be decoded and then video-processed even when a random access to the coded video data has occurred. In this case, the random access refers to, for example, a case where pieces of the coded video data are not sequentially decoded and displayed but decoding and displaying points are skipped or video splicing is performed.

In other words, the video coder 110 may generate metadata information to be inserted into a starting part of each scene and used for a video process, or metadata information used for video-processing of pictures having a decoding order after a random access point picture.

The random access point picture refers to a picture of a point when a random access has occurred. An intra random access point (IRAP) picture capable of serving as a random-accessible random access point is the first picture of a video bitstream in a decoding order when a random access has occurred, and may include only I slices. The IRAP picture may be a clean random access (CRA) picture, a broken link access (BLA) picture, or an instantaneous decoding refresh (IDR) picture.

The CRA picture is a picture capable of serving as a random access point when a group of pictures (GOP) has an open structure. Since the CRA picture is an IRAP picture, the CRA picture includes only I slices and may be the first or middle picture of the video bitstream in a decoding order. When the video bitstream is cut or lost or pictures are spliced and thus a random access has occurred in the CRA picture, preceding pictures having a decoding order before the CRA picture become unavailable. When the preceding pictures capable of serving as reference pictures of leading pictures are unavailable, the leading pictures referring to the unavailable pictures may not be normally decoded.

The BLA picture serves as a random access point when coded pictures are spliced or the video bitstream is cut, and refers to a picture located in the middle of the video bitstream. The BLA picture has functions and properties similar to those of the CRA picture. However, if a random access has occurred, since the BLA picture is regarded as the beginning of a new sequence, unlike the CRA picture, when the BLA picture is received by a decoder, all video parameter information may be received again. The BLA picture may be determined by the video coding apparatus 100, or an external apparatus having received the video bitstream from the video coding apparatus 100 may change the CRA picture into the BLA picture. For example, when video bitstreams are spliced, the external apparatus having received the video bitstreams may change the CRA picture into the BLA picture and transmit the video bitstreams to the video decoding apparatus 200 for decoding the video bitstreams, In this case, video parameter information may also be newly provided from the external apparatus to the video decoding apparatus 200.

To prevent loss of metadata information of each scene, which is used for a video process, even when a random access has occurred in the video data processing apparatus 200, the video coder 110 may generate metadata identification information to be included in the locations of all pictures belonging to each scene of the video bitstream.

The bitstream generator 130 may generate a bitstream of the coded video data, which includes the metadata information. The bitstream generator 130 may generate the video bitstream including the metadata information by inserting the metadata information into a starting part of each scene, or inserting the metadata information into an appropriate location in consideration of a random access point picture where a random access can occur, and adjacent pictures thereof. When a random access has occurred, since some skipped pictures and the metadata information are not decoded, the location of the metadata information inserted into the video bitstream is significant in such a manner that pictures having a decoding order after a random access point picture may be decoded and then video-processed.

The bitstream generator 130 may generate the bitstream by inserting the metadata information into the location of the random access point picture and the location of a scene cut of a scene including one or more pictures having a decoding order after the random access point picture. In this case, the scene cut refers to a part where a scene including a plurality of pictures is switched to another scene including a plurality of pictures. If the location of the random access point picture corresponds to the location of a scene cut of an arbitrary scene, the bitstream generator 130 may substitute the metadata information of the scene corresponding to the scene cut for the metadata information to be inserted into the location of the random access point picture. As such, the same metadata information may not be repeatedly inserted.

The location of the scene cut may correspond to the location of the first picture in a display order among pictures belonging to each scene. The metadata information of an arbitrary scene may be inserted into the location of a scene cut corresponding to a previous scene of the arbitrary scene. As such, a delay due to decoding of the metadata information may be minimized or prevented by inserting the metadata information into the location of a scene cut corresponding to a previous scene of a scene to which the metadata information is applied, in consideration of a time taken to decode the metadata information.

Based on the location of the random access point picture in the video bitstream, leading pictures preceding the random access point picture in a display order but following the random access point picture in a decoding order may be present. The leading pictures may be divided into normally decodable leading pictures and undecodable leading pictures. Based on the location of the random access point picture, no decodable leading pictures may be present, or one or more decodable leading pictures belonging to the same scene as or a different scene from the random access point picture may be present.

When no leading pictures are present with respect to the random access point picture and the location of the random access point picture is not the location of a scene cut, the bitstream generator 130 may generate the bitstream by inserting the metadata information of the scene to which the random access point picture belongs, into the location of the random access point picture.

When a plurality of decodable leading pictures are present with respect to the random access point picture, if all of the decodable leading pictures belong to a different scene from the random access point picture, the bitstream generator 130 may generate the bitstream by inserting the metadata information of the scene to which the random access point picture belongs, into the location of the random access point picture, and inserting the metadata information of the scene to which the decodable leading pictures belong, into the location of the first decodable leading picture in a display order.

When a plurality of decodable leading pictures are present with respect to the random access point picture, if all of the decodable leading pictures belong to the same scene as the random access point picture, the bitstream generator 130 may generate the bitstream by inserting the metadata information of the scene including the decodable leading pictures, into the location of the first decodable leading picture in the display order. However, in consideration of a case where even the decodable leading pictures are not decoded or are removed from the video bitstream, if the decodable leading pictures belong to the same scene as the random access point picture, the bitstream generator 130 may generate the bitstream by inserting the metadata information into both of the location of the first decodable leading picture in the display order and the location of the random access point picture. In addition, when a decodable leading picture is removed, the bitstream generator 130 may move the metadata information included in the location of the picture, to the location of the random access point picture belonging to the same scene, because an undecodable leading picture and/or a decodable leading picture can be removed in a video decoding operation or a video output operation.

The bitstream generator 130 may generate the bitstream of the coded video data, which includes the metadata identification information. When the video coder 110 has generated the metadata identification information, the bitstream generator 130 may generate the video bitstream including the metadata identification information instead of the metadata information. Instead of directly including the metadata information, the metadata identification information is included in a predetermined location in the video bitstream to reduce a file size and to prevent overhead. However, when the bitstream generator 130 generates the video bitstream including the metadata identification information, parameters including predetermined values or conditions applicable when the metadata information is used for a video process may be included.

A metadata information database including the metadata information may be transmitted from the video data generating apparatus 100 to the video data processing apparatus 200 via an independent channel separately from the video bitstream including the metadata identification information. The metadata information database refers to at least one piece of metadata information stored in a predetermined storage space of the video data processing apparatus 200. The metadata information database may be transmitted from the video data generating apparatus 100 to the video data processing apparatus 200 at one time or in a distributed manner, and stored in the video data processing apparatus 200. The video data processing apparatus 200 may find the metadata information used for a video data process, from the metadata information database by using the metadata identification information. The metadata information database may be transmitted from the video data generating apparatus 100 to the video data processing apparatus 200 before the video bitstream is transmitted, or together with the video bitstream via different channels.

Figure 3B:
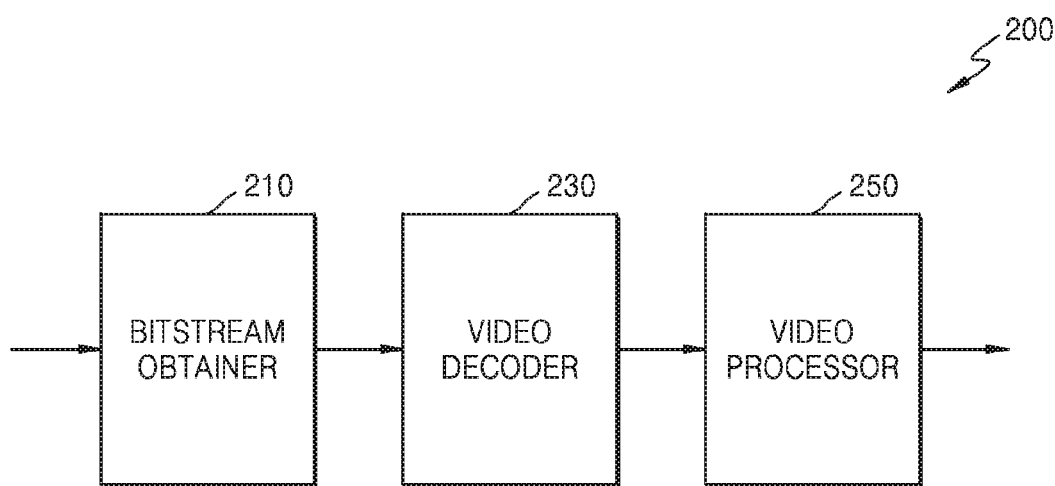
FIG. 3B is a block diagram of a video data processing apparatus according to an embodiment.

FIG. 3B is a block diagram of the video data processing apparatus 200 according to an embodiment. It will be understood by one of ordinary skill in the art that the video data processing apparatus 200 may include general-use hardware elements in addition to elements illustrated in FIG. 3B.

The video data processing apparatus 200 may include a bitstream obtainer 210, a video decoder 230, and a video processor 250.

The bitstream obtainer 210 may obtain a video bitstream. The bitstream obtainer 210 may obtain the video bitstream received by the video data processing apparatus 200, and transmit the video bitstream to the video decoder 230.

The video decoder 230 may decode the video bitstream. The video decoder 230 may extract metadata information usable for decoded video data when coded video data is decoded and then video-processed, from the video bitstream. When a random access to the coded video data has occurred, the metadata information may be extracted from the decoded video data after a random access point picture in such a manner that pictures having a decoding order after the random access point picture may be decoded and then video-processed.

The video processor 250 may obtain the metadata information used for video-processing of the pictures having the decoding order after the random access point picture in the video bitstream.

The video processor 250 may obtain the metadata information based on the location of the random access point picture in the video bitstream and the location of a scene cut of a scene including one or more pictures having a decoding order after the random access point picture. In this case, if the location of the random access point picture corresponds to the location of a scene cut of an arbitrary scene, the video processor 250 may use the metadata information of the scene corresponding to the scene cut, as the metadata information to be obtained from the location of the random access point picture.

The location of the scene cut may correspond to the location of the first picture in a display order among pictures belonging to each scene. The metadata information of an arbitrary scene may be obtained from the location of a scene cut corresponding to a previous scene of the arbitrary scene. As such, a delay due to decoding of the metadata information may be minimized or prevented by inserting the metadata information into the location of a scene cut corresponding to a previous scene of a scene to which the metadata information is applied, in consideration of a time taken to decode the metadata information.

Based on the location of the random access point picture, no decodable leading pictures may be present, or one or more decodable leading pictures belonging to the same scene as or a different scene from the random access point picture may be present.

When no leading pictures are present with respect to the random access point picture and the location of the random access point picture is not the location of a scene cut, the video processor 250 may obtain the metadata information of the scene to which the random access point picture belongs, based on the location of the random access point picture.

When a plurality of decodable leading pictures are present with respect to the random access point picture, if all of the decodable leading pictures belong to a different scene from the random access point picture, the video processor 250 may obtain the metadata information of the scene to which the random access point picture belongs, based on the location of the random access point picture, and obtain the metadata information of the scene to which the decodable leading pictures belong, based on the location of the first decodable leading picture in a display order. When a plurality of decodable leading pictures are present with respect to the random access point picture, if all of the decodable leading pictures belong to the same scene as the random access point picture, the video processor 250 may obtain the metadata information of the scene to which the decodable leading pictures belong, based on the location of the first decodable leading picture in the display order. However, in consideration of a case where even the decodable leading pictures are not decoded or are removed from the video bitstream, if the decodable leading pictures belong to the same scene as the random access point picture, since the metadata information may be included in both of the location of the first decodable leading picture in the display order and the location of the random access point picture, the video processor 250 may obtain the metadata information based on the two locations. In addition, when a decodable leading picture is removed, the metadata information included in the location of the picture may be moved to the location of the random access point picture belonging to the same scene. As such, in this case, the video processor 250 may obtain the metadata information based on the location of the random access point picture.

The video processor 250 may perform video-processing on the decoded video data among the pictures having a decoding order after the random access point picture, based on the obtained metadata information.

When the video data generating apparatus 100 has transmitted the video bitstream by including metadata identification information in a predetermined location in the video bitstream, the video processor 250 may obtain the metadata information from a metadata information database based on the metadata identification information. For example, the metadata identification information may be included in the locations of all pictures belonging to each scene of the video bitstream. The video processor 250 may obtain the metadata information mapped to the metadata identification information, from the metadata information database. The metadata information database may be received from the video data generating apparatus 100 via a channel different from a channel via which the video bitstream is received, before the video bitstream is received.

Examples of an operation of generating a bitstream of coded video data and an operation of processing the bitstream of the coded video data will now be described. A video bitstream using metadata identification information in consideration of a random access will be described in detail with reference to FIGS. 4 and 5, and a video bitstream considering an optimal location of metadata information in the video bitstream in consideration of a random access will be described in detail with reference to FIGS. 6A to 6C.

Figure 4:
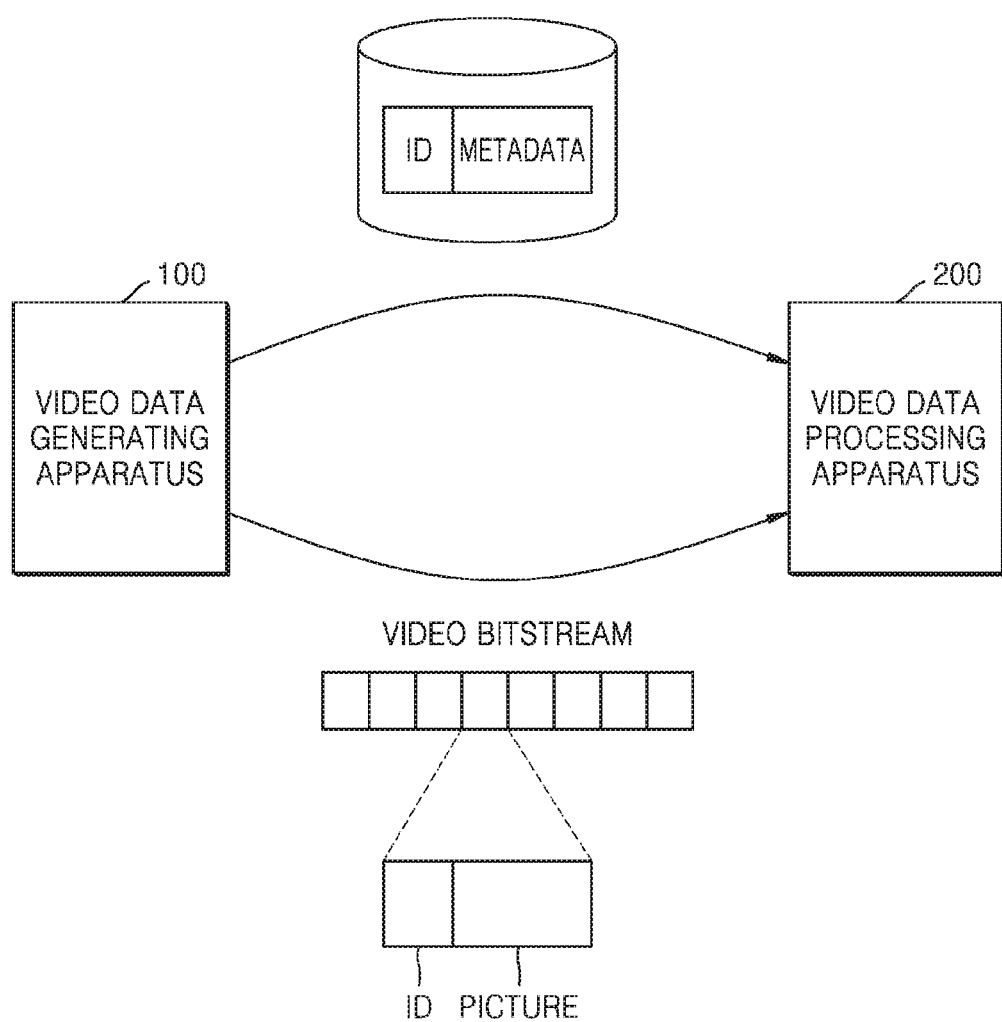
FIG. 4 is a schematic diagram for describing a method of generating and processing a bitstream of coded video data by using metadata identification information, according to an embodiment.

FIG. 4 is a schematic diagram for describing a method of generating and processing a bitstream of coded video data by using metadata identification information, according to an embodiment.

Referring to FIG. 4, the video data generating apparatus 100 may transmit a video bitstream to the video data processing apparatus 200. To prevent loss of metadata information of each scene used for a video process even when a random access has occurred in the video data processing apparatus 200, the video bitstream may include metadata identification information in the locations of all pictures belonging to each scene of the video bitstream. The metadata identification information may include an identifier (ID) of the metadata information and location information of the metadata information. Instead of directly including the metadata information, the metadata identification information is included in the locations of all pictures belonging to each scene to reduce a file size and to prevent overhead. The metadata identification information may be used to search a metadata information database for the metadata information.

Although the metadata identification information may be included in the locations of all pictures belonging to each scene, to further reduce a file size, the number of times that the metadata identification information is transmitted may be reduced. For example, the metadata identification information may be transmitted every predetermined number of pictures among pictures belonging to the same scene.

The metadata information may be transmitted from the video data generating apparatus 100 to the video data processing apparatus 200 via an independent channel separately from the video bitstream including the metadata identification information. A part of or the whole metadata information database having all metadata information may be transmitted from the video data generating apparatus 100 to the video data processing apparatus 200. The metadata information may be transmitted via a channel different from a channel via which the video bitstream is transmitted, before the video bitstream is transmitted. For example, the metadata information may be transmitted via a safe channel used to transmit syntax data such as a sequence parameter set (SPS) or picture parameter set (PPS). Some or all metadata information may be periodically transmitted with a long term. The number of times that the metadata identification information is transmitted may be greater than the number of times that the metadata information database searchable for the metadata information is transmitted.

FIGS. 5A and 5B are tables showing message formats for transmitting metadata identification information.

The message format of FIG. 5A may include both the metadata identification information and the metadata information, and a conditional statement in the message format may be used to determine whether to include the metadata information or not. In FIG. 5A, the metadata information may be included and transmitted if the value of a "meta_data_info_present_flag" is "true", and only the metadata identification information may be included and transmitted if the value of the "meta_data_info_present_flag" is "false". Accordingly, when the metadata identification information is included and transmitted in each picture, the value of the "meta_data_info_present_flag" may be set to "false".

Unlike the message format of FIG. 5A which uses a conditional statement to indicate the type of transmitted data, the message format of FIG. 5B separately defines a message format for transmitting the metadata information and a message format for transmitting the metadata identification information. In FIG. 5B, a "meta_data_info" message format may transmit the metadata information, and a "meta_data_pointer" message format may transmit the metadata identification information. Accordingly, when the metadata identification information is included and transmitted in each picture, the "meta_data_pointer" message format may be used.

FIG. 6A is a schematic diagram for describing a method of generating and processing a bitstream of coded video data in consideration of an optimal location of metadata information in the video bitstream, according to an embodiment.

Referring to FIG. 6A, a part of video data having different display and decoding orders is shown. In the display order or an output order, the video data corresponds to pictures from the $26^{th}$ picture to the $32^{nd}$ picture, and may be regarded as a sequence of pictures to be sequentially displayed from the $26^{th}$ picture. However, in the decoding order, a picture corresponding to the $27^{th}$ picture in the display order has the $24^{th}$ decoding order which is the earliest, and a picture corresponding to the $32^{nd}$ picture in the display order has the $34^{th}$ decoding order which is the latest.

As illustrated in FIG. 6A, assuming that a random access has occurred in a picture corresponding to the $31^{st}$ picture in the display order, a random access point picture is the picture corresponding to the $31^{st}$ picture in the display order. Since the picture corresponding to the $31^{st}$ picture in the display order has the $28^{th}$ decoding order, only pictures after the $28^{th}$ decoding order may be decoded. Accordingly, the $26^{th}$ and $27^{th}$ pictures in the display order have the $27^{th}$ and $24^{th}$ decoding orders and thus may not be decoded.

Referring to FIG. 6A, the $28^{th}$, $29^{th}$, and $30^{th}$ pictures in the display order precede the $31^{st}$ picture, which is the random access point picture, in the display order but follow the $31^{st}$ picture in the decoding order, and thus correspond to leading pictures and, more particularly, to decodable leading pictures. Pictures following the random access point picture both in the display order and in the decoding order are called trailing pictures. Referring to FIG. 6A, the $32^{nd}$ picture in the display order follows the $31^{st}$ picture, which is the random access point picture, both in the display order and in the decoding order, and thus corresponds to a trailing picture. When the above-described video data is coded to generate a video bitstream, the video bitstream into which metadata information corresponding to each scene is inserted may be generated in consideration of a random access as described below.

Referring to FIG. 6A, since a random access has occurred in the picture having the $28^{th}$ decoding order, metadata information of the pictures after the $28^{th}$ decoding order should be inserted when the video bitstream is generated. As illustrated in FIG. 6A, the $29^{th}$, $30^{th}$, and $31^{st}$ pictures in the decoding order are decodable leading pictures and correspond to a first scene different from a second scene to which the random access point picture belongs, and thus first metadata information m1 should be inserted. The $28^{th}$ and $34^{th}$ pictures in the decoding order correspond to the second scene and thus second metadata information m2 should be inserted. However, when the video bitstream is generated, since the pictures are arranged in the decoding order irrespective of the display order or a scene order, metadata information may be preferentially inserted into the location of a picture which firstly requires metadata information in consideration of the decoding order, but the already-inserted metadata information should not be repeatedly included.

As illustrated in FIG. 6A, when a random access has occurred and thus the picture having the $28^{th}$ decoding order serves as the random access point picture, the second metadata information m2 of the second scene to which the random access point picture belongs may be inserted into the location of the random access point picture. In this case, the location of the random access point picture may be a location immediately before or after the random access point picture, and the second metadata information m2 may be inserted in front of the random access point picture as illustrated in FIG. 6A.

Then, the pictures having the $29^{th}$, $30^{th}$, and $31^{st}$ decoding orders correspond to the first scene, and the first metadata information m1 of the first scene may be inserted into the location of a scene cut of the first scene. In this case, the location of the scene cut of the first scene may be a location immediately before or after the pictures belonging to the first scene and, more particularly, the location of the first picture in the display order among the pictures belonging to the first scene. As illustrated in FIG. 6A, the picture having the $30^{th}$ decoding order is the first picture in the display order among the pictures belonging to the first scene, and thus the first metadata information m1 may be inserted in front of the picture having the $30^{th}$ decoding order. The pictures having the $29^{th}$ and $31^{st}$ decoding orders may use the first metadata information m1 inserted in front of the picture having the $30^{th}$ decoding order, and thus the first metadata information m1 does not need to be repeatedly inserted.

Thereafter, metadata information of a scene to which each of pictures after the $32^{nd}$ decoding order belongs may be inserted into the location of a scene cut of the scene, but the already-inserted metadata information is not repeatedly inserted. As illustrated in FIG. 6A, the picture having the $34^{th}$ decoding order corresponds to the second scene but the second metadata information m2 has been already inserted in front of the random access point picture. Thus, the second metadata information m2 is not repeatedly inserted.

When a random access has occurred in the video data processing apparatus 200, a video bitstream including metadata information and generated in consideration of a random access may be processed based on a reverse operation of an operation of generating the video bitstream. In other words, the video data processing apparatus 200 may obtain metadata information based on a location in the video bitstream, into which the metadata information of each scene to which decodable pictures among pictures having a decoding order after a random access point picture belong is initially inserted, and perform video-processing on decoded pictures based on the obtained metadata information.

Figure 6B:
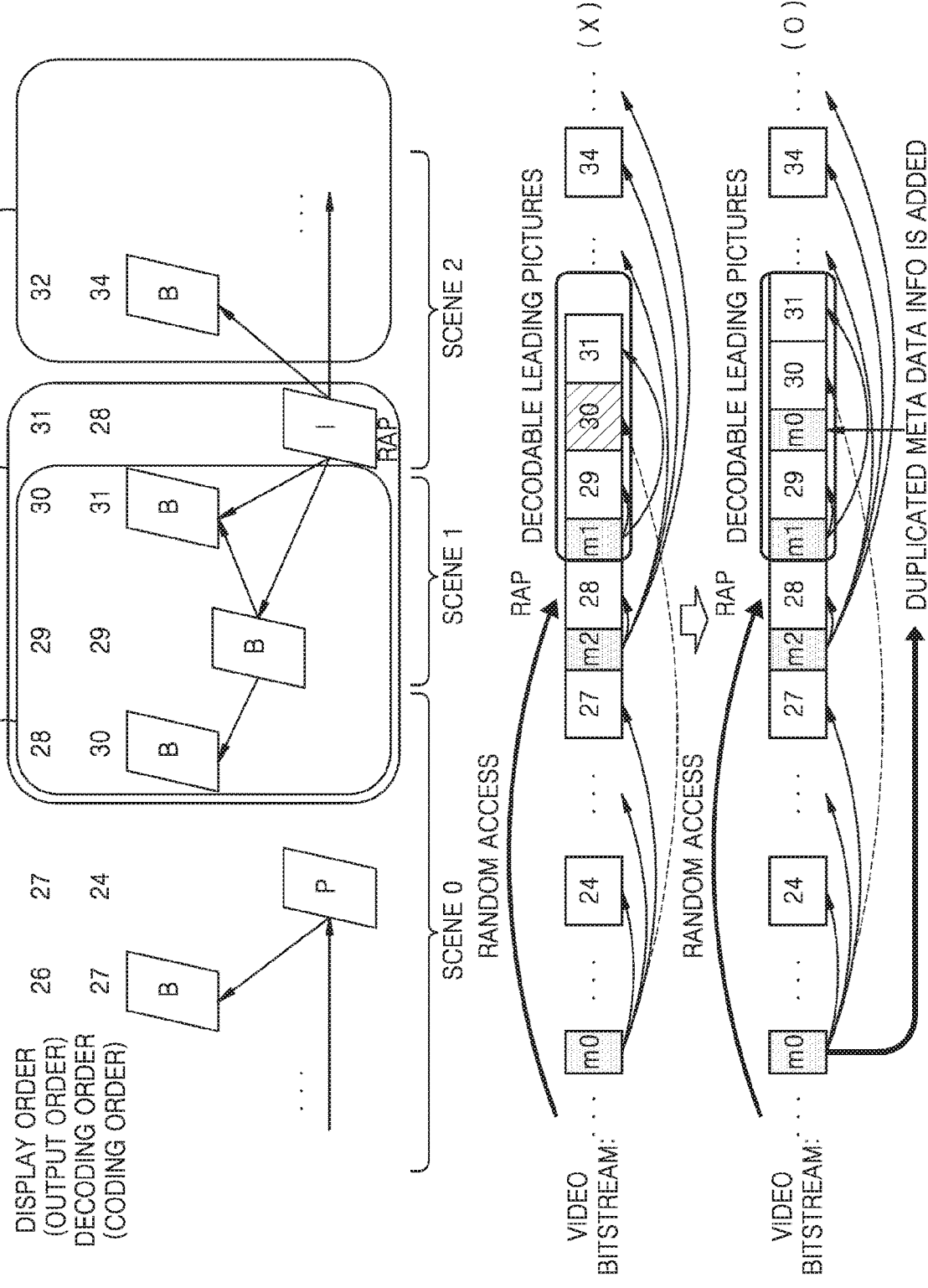
FIG. 6B is a schematic diagram for describing a method of generating and processing a bitstream of coded video data in consideration of an optimal location of metadata information in the video bitstream, according to another embodiment.

FIG. 6B is a schematic diagram for describing a method of generating and processing a bitstream of coded video data in consideration of an optimal location of metadata information in the video bitstream, according to another embodiment.

Display and decoding orders of a part of video data illustrated in FIG. 6B are the same as those of the part of the video data illustrated in FIG. 6A, except that pictures corresponding to a zeroth scene and pictures corresponding to a first scene differ. In other words, FIG. 6B shows a case where decodable leading pictures belong to a plurality of scenes different from a scene to which a random access point picture belongs. A description is now given of the difference from the method of FIG. 6A in a case where a picture corresponding to the $28^{th}$ picture in a display order belongs to the zeroth scene other than the first scene.

As illustrated in FIG. 6B, since the random access point picture is a picture corresponding to the $31^{st}$ picture in the display order and the picture corresponding to the $31^{st}$ picture in the display order has the $28^{th}$ decoding order, only pictures after the $28^{th}$ decoding order may be decoded. The $28^{th}$, $29^{th}$, and $30^{th}$ pictures in the display order correspond to decodable leading pictures. The $32^{nd}$ picture in the display order corresponds to a trailing picture. When the above-described video data is coded to generate a video bitstream, the video bitstream into which metadata information corresponding to each scene is inserted may be generated in consideration of a random access as described below.

Referring to FIG. 6B, since a random access has occurred in the picture having the $28^{th}$ decoding order, metadata information of the pictures after the $28^{th}$ decoding order should be inserted when the video bitstream is generated. The $29^{th}$, $30^{th}$, and $31^{st}$ pictures in the decoding order are decodable leading pictures. The $30^{th}$ pictures in the decoding order corresponds to the zeroth scene, and thus zeroth metadata information m0 should be inserted when the video bitstream is generated. The $29^{th}$ and $31^{st}$ pictures in the decoding order correspond to the first scene, and thus first metadata information m1 should be inserted when the video bitstream is generated. The 28$^{th}$ and 34$^{th}$ pictures in the decoding order correspond to a second scene and thus second metadata information m2 should be inserted.

As illustrated in FIG. 6B, when a random access has occurred and thus the picture having the 28$^{th}$ decoding order serves as the random access point picture, the second metadata information m2 of the second scene to which the random access point picture belongs may be inserted into the video bitstream in front of the random access point picture.

Then, the picture having the 29$^{th}$ decoding order corresponds to the first scene, and the first metadata information m1 of the first scene may be inserted into the location of a scene cut of the first scene. As illustrated in FIG. 6B, the picture having the 29$^{th}$ decoding order is the first picture in the display order among the pictures belonging to the first scene, and thus the first metadata information m1 may be inserted into the video bitstream in front of the picture having the 29$^{th}$ decoding order.

Thereafter, the picture having the 30$^{th}$ decoding order corresponds to the zeroth scene, and the zeroth metadata information m0 of the zeroth scene may be inserted into the video bitstream. In this case, since only the picture having the 30$^{th}$ decoding order is decodable among the pictures belonging to the zeroth scene as illustrated in FIG. 6B, the zeroth metadata information m0 may be inserted into video bitstream in front of the picture having the 30$^{th}$ decoding order.

Then, the picture having the 31$^{st}$ decoding order may use the first metadata information m1 already inserted in front of the picture having the 29$^{th}$ decoding order, and thus the first metadata information m1 does not need to be repeatedly inserted.

Thereafter, metadata information of a scene to which each of pictures after the 32$^{nd}$ decoding order belongs may be inserted into the location of a scene cut of the scene, but the already-inserted metadata information is not repeatedly inserted. As illustrated in FIG. 6B, the picture having the 34$^{th}$ decoding order corresponds to the second scene but the second metadata information m2 has been already inserted in front of the random access point picture. Thus, the second metadata information m2 is not repeatedly inserted.

When a random access has occurred in the video data processing apparatus 200, a video bitstream including metadata information and generated in consideration of a random access may be processed based on a reverse operation of an operation of generating the video bitstream. In other words, the video data processing apparatus 200 may obtain metadata information based on a location into which the metadata information of each scene to which decodable pictures among pictures having a decoding order after a random access point picture belong is initially inserted, and perform video-processing on decoded pictures based on the obtained metadata information.

Figure 6C:
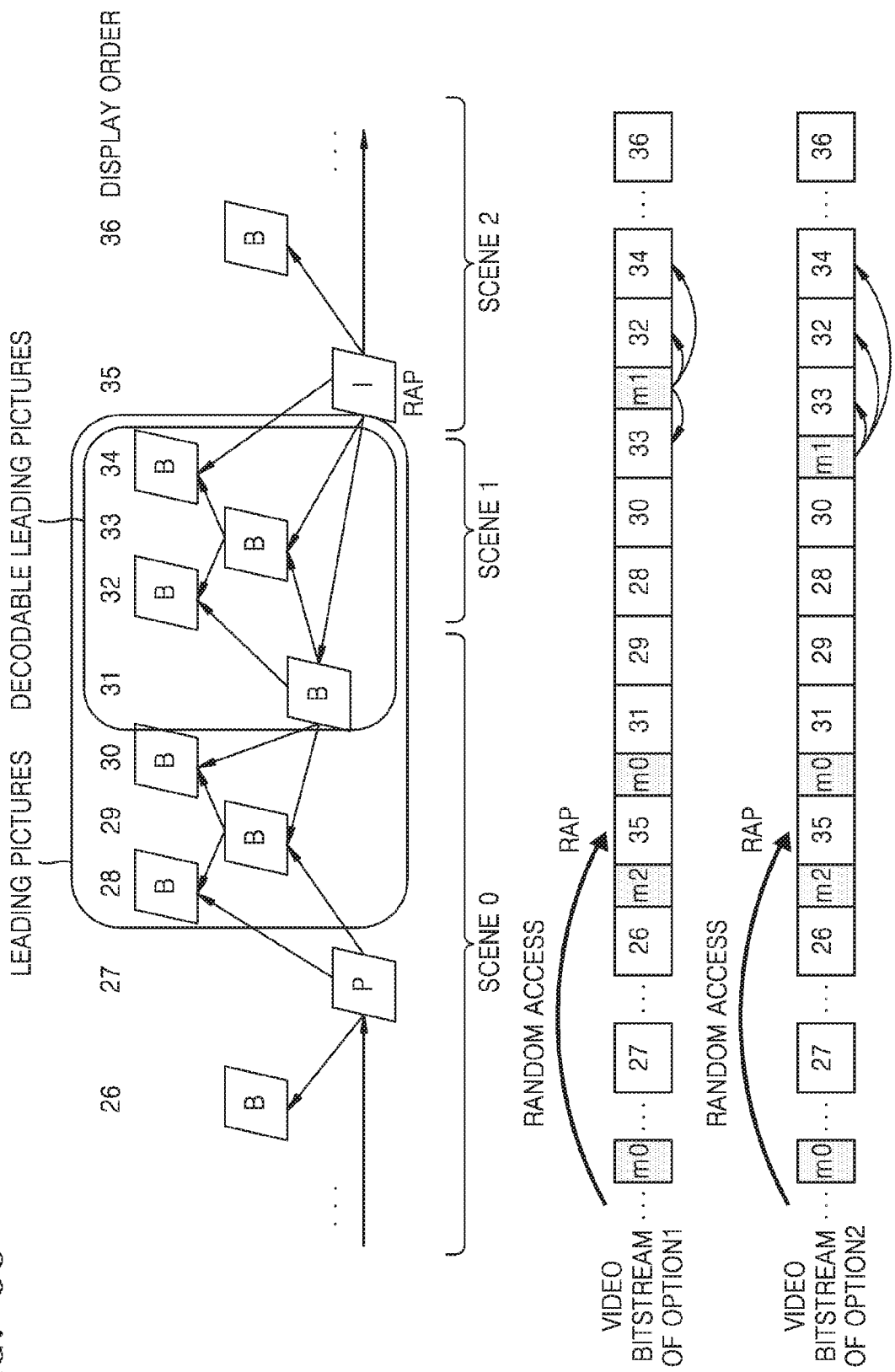
FIG. 6C is a schematic diagram for describing a method of generating and processing a bitstream of coded video data in consideration of an optimal location of metadata information in the video bitstream, according to another embodiment.

FIG. 6C is a schematic diagram for describing a method of generating and processing a bitstream of coded video data in consideration of an optimal location of metadata information in the video bitstream, according to another embodiment.

Referring to FIG. 6C, a part of video data is shown. The video data corresponds to pictures from the 26$^{th}$ picture to the 36$^{th}$ picture in a display order, and may be regarded as a sequence of pictures to be sequentially displayed from the 26$^{th}$ picture. However, a decoding order differs from the display order as indicated by arrows showing relationships between pictures.

As illustrated in FIG. 6C, assuming that a random access has occurred in a picture corresponding to the 35$^{th}$ picture in the display order, a random access point picture is the picture corresponding to the 35$^{th}$ picture in the display order. Pictures corresponding to the 26$^{th}$ and 27$^{th}$ pictures in the display order precede the random access point picture in a coding order, and thus do not correspond to a video bitstream considering a random access to the 35$^{th}$ picture. Referring to FIG. 6C, the video bitstream considering a random access to the 35$^{th}$ picture may correspond to only pictures having a decoding order after the 35$^{th}$ picture. That is, when the pictures arranged in the display order are re-arranged in the decoding order, the 35$^{th}$, 31$^{st}$, 29$^{th}$, 28$^{th}$, 30$^{th}$, 33$^{rd}$, 32$^{nd}$, 34$^{th}$, and 36$^{th}$ pictures may correspond to the video bitstream considering a random access to the 35$^{th}$ picture. However, the 28$^{th}$ to 30$^{th}$ pictures in the display order are undecodable leading pictures, and thus metadata information of the 28$^{th}$ to 30$^{th}$ pictures does not need to be inserted into the video bitstream.

FIG. 6C shows two methods about locations of the video bitstream into which first metadata information m1 of the 32$^{nd}$, 33$^{rd}$, and 34$^{th}$ pictures belonging to a first scene among decodable leading pictures is inserted.

First, a video bitstream of option 1 shows a method of inserting metadata information into the location of the first picture in the display order among pictures belonging to each scene. Based on this method, since the 32$^{nd}$ picture among the 32$^{nd}$, 33$^{rd}$, and 34$^{th}$ pictures belonging to the first scene corresponds to the first picture in the display order, the first metadata information m1 is inserted in front of the 32$^{nd}$ picture. The above-described methods of FIGS. 6A and 6B correspond to the method of inserting metadata information corresponding to each scene into the location of the first picture in the display order among pictures belonging to the scene.

Second, a video bitstream of option 2 shows a method of inserting metadata information into the location of the first picture in a coding order among pictures belonging to each scene. Based on this method, since the 33$^{rd}$ picture among the 32$^{nd}$, 33$^{rd}$, and 34$^{th}$ pictures belonging to the first scene corresponds to the first picture in the decoding order, the first metadata information m1 is inserted in front of the 33$^{rd}$ picture. The above-described methods of FIGS. 6A and 6B may follow the method of inserting metadata information corresponding to each scene into the location of the first picture in the decoding order among pictures belonging to the scene.

When a video bitstream is generated and processed in consideration of a random access, a method of transmitting metadata identification information in an optimal location in the bitstream may be used by combining the method of reducing a bitrate by using metadata identification information, which is described above in relation to FIGS. 4 and 5, and a method of considering an optimal location in a video bitstream into which metadata information is to be inserted, which is described above in relation to FIGS. 6A to 6C.

Figure 7A:
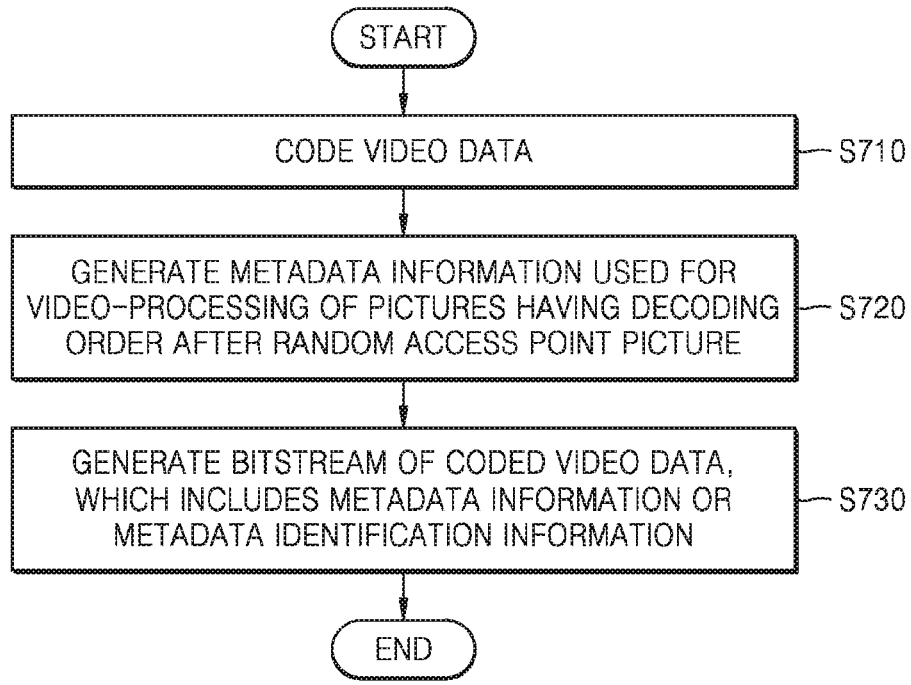
FIG. 7A is a flowchart of a coded video data generating method according to an embodiment.

FIG. 7A is a flowchart of a coded video data generating method according to an embodiment. Although not provided herein, the above descriptions of the video data generating apparatus 100 may be equally applied to the coded video data generating method.

In operation 710, the video data generating apparatus 100 may code video data. The video data generating apparatus 100 may generate coded video data by coding input video in a coding order.

In operation 720, the video data generating apparatus 100 may generate metadata information to be inserted into a starting part of each scene and used for a video process, or metadata information used for video-processing of pictures having a decoding order after a random access point picture. The video data generating apparatus 100 may generate metadata information usable when the coded video data is decoded and then video-processed. The metadata information may be prepared in such a manner that pictures having a decoding order after a random access point picture may be decoded and then video-processed even when a random access to the coded video data has occurred.

To prevent loss of metadata information of each scene, which is used for a video process, even when a random access has occurred in the video data processing apparatus 200, the video data generating apparatus 100 may generate metadata identification information to be included in the locations of all pictures belonging to each scene of the video bitstream.

In operation 730, the video data generating apparatus 100 may generate a bitstream of the coded video data, which includes the metadata information or the metadata identification information. The video data generating apparatus 100 may generate the video bitstream including the metadata information by inserting the metadata information into a starting part of each scene, or inserting the metadata information into an appropriate location in consideration of a random access point picture where a random access can occur, and adjacent pictures thereof.

The video data generating apparatus 100 may generate the bitstream by inserting the metadata information into the location of the random access point picture and the location of a scene cut of a scene including one or more pictures having a decoding order after the random access point picture. In this case, if the location of the random access point picture corresponds to the location of a scene cut of an arbitrary scene, the video data generating apparatus 100 may substitute the metadata information of the scene corresponding to the scene cut for the metadata information to be inserted into the location of the random access point picture. As such, the same metadata information may not be repeatedly inserted.

The location of the scene cut may correspond to the location of the first picture in a display order among pictures belonging to each scene. The metadata information of an arbitrary scene may be inserted into the location of a scene cut corresponding to a previous scene of the arbitrary scene. As such, a delay due to decoding of the metadata information may be minimized or prevented by inserting the metadata information into the location of a scene cut corresponding to a previous scene of a scene to which the metadata information is applied, in consideration of a time taken to decode the metadata information.

Based on the location of the random access point picture, no decodable leading pictures may be present, or a plurality of decodable leading pictures belonging to the same scene as or a different scene from the random access point picture may be present.

When no leading pictures are present with respect to the random access point picture and the location of the random access point picture is not the location of a scene cut, the video data generating apparatus 100 may generate the bitstream by inserting the metadata information of the scene to which the random access point picture belongs, into the location of the random access point picture.

When a plurality of decodable leading pictures are present with respect to the random access point picture, if all of the decodable leading pictures belong to a different scene from the random access point picture, the video data generating apparatus 100 may generate the bitstream by inserting the metadata information of the scene to which the random access point picture belongs, into the location of the random access point picture, and inserting the metadata information of the scene to which the decodable leading pictures belong, into the location of the first decodable leading picture in the display order.

When a plurality of decodable leading pictures are present with respect to the random access point picture, if all of the decodable leading pictures belong to the same scene as the random access point picture, the video data generating apparatus 100 may generate the bitstream by inserting the metadata information of the scene including the decodable leading pictures, into the location of the first decodable leading picture in the display order. However, in consideration of a case where even the decodable leading pictures are not decoded or are removed from the video bitstream, if the decodable leading pictures belong to the same scene as the random access point picture, the video data generating apparatus 100 may generate the bitstream by inserting the metadata information into both of the location of the first decodable leading picture in the display order and the location of the random access point picture. In addition, when a decodable leading picture is removed, the video data generating apparatus 100 may move the metadata information included in the location of the picture, to the location of the random access point picture belonging to the same scene.

The video data generating apparatus 100 may generate the bitstream of the coded video data, which includes the metadata identification information. When the video data generating apparatus 100 has generated the metadata identification information, the video data generating apparatus 100 may generate the video bitstream including the metadata identification information instead of the metadata information. The video data generating apparatus 100 may generate the video bitstream in such a manner that the metadata identification information is included in a predetermined location in the video bitstream. A metadata information database including the metadata information may be transmitted from the video data generating apparatus 100 to the video data processing apparatus 200 via an independent channel separately from the video bitstream including the metadata identification information.

Figure 7B:
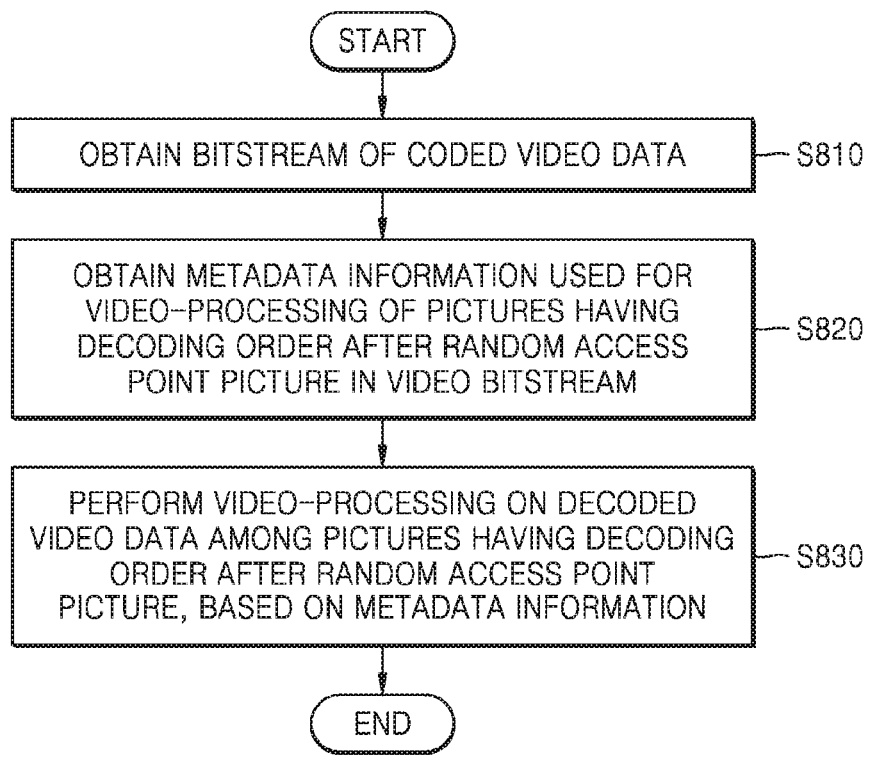
FIG. 7B is a flowchart of a coded video data processing method according to an embodiment.

FIG. 7B is a flowchart of a coded video data processing method according to an embodiment. Although not provided herein, the above descriptions of the video data processing apparatus 200 may be equally applied to the coded video data processing method.

In operation 810, the video data processing apparatus 200 may obtain a video bitstream. The video data processing apparatus 200 may decode the obtained video bitstream. The video data processing apparatus 200 may extract metadata information usable for decoded video data when coded video data is decoded and then video-processed, from the video bitstream. When a random access to the coded video data has occurred, the metadata information may be extracted from the decoded video data after a random access point picture in such a manner that pictures having a decoding order after the random access point picture may be decoded and then video-processed.

In operation 820, the video data processing apparatus 200 may obtain the metadata information used for video-processing of the pictures having the decoding order after the random access point picture in the video bitstream.

The video data processing apparatus 200 may obtain the metadata information based on the location of the random access point picture in the video bitstream and the location of a scene cut of a scene including one or more pictures having a decoding order after the random access point picture. In this case, if the location of the random access point picture corresponds to the location of a scene cut of an arbitrary scene, the video data processing apparatus 200 may use the metadata information of the scene corresponding to the scene cut, as the metadata information to be obtained from the location of the random access point picture.

The location of the scene cut may correspond to the location of the first picture in a display order among pictures belonging to each scene. The metadata information of an arbitrary scene may be obtained from the location of a scene cut corresponding to a previous scene of the arbitrary scene. As such, a delay due to decoding of the metadata information may be minimized or prevented by inserting the metadata information into the location of a scene cut corresponding to a previous scene of a scene to which the metadata information is applied, in consideration of a time taken to decode the metadata information.

Based on the location of the random access point picture, no decodable leading pictures may be present, or one or more decodable leading pictures belonging to the same scene as or a different scene from the random access point picture may be present.

When no leading pictures are present with respect to the random access point picture and the location of the random access point picture is not the location of a scene cut, the video data processing apparatus 200 may obtain the metadata information of the scene to which the random access point picture belongs, based on the location of the random access point picture.

When a plurality of decodable leading pictures are present with respect to the random access point picture, if all of the decodable leading pictures belong to a different scene from the random access point picture, the video data processing apparatus 200 may obtain the metadata information of the scene to which the random access point picture belongs, based on the location of the random access point picture, and obtain the metadata information of the scene to which the decodable leading pictures belong, based on the location of the first decodable leading picture in the display order.

When a plurality of decodable leading pictures are present with respect to the random access point picture, if all of the decodable leading pictures belong to the same scene as the random access point picture, the video data processing apparatus 200 may obtain the metadata information of the scene to which the decodable leading pictures belong, based on the location of the first decodable leading picture in the display order. However, in consideration of a case where even the decodable leading pictures are not decoded or are removed from the video bitstream, if the decodable leading pictures belong to the same scene as the random access point picture, since the metadata information may be included in both of the location of the first decodable leading picture in the display order and the location of the random access point picture, the video data processing apparatus 200 may obtain the metadata information based on the two locations. In addition, when a decodable leading picture is removed, the metadata information included in the location of the picture may be moved to the location of the random access point picture belonging to the same scene. As such, in this case, the video data processing apparatus 200 may obtain the metadata information based on the location of the random access point picture.

When the video data generating apparatus 100 has transmitted the video bitstream by including metadata identification information in a predetermined location in the video bitstream, the video data processing apparatus 200 may obtain the metadata information from a metadata information database based on the metadata identification information. For example, the metadata identification information may be included in the locations of all pictures belonging to each scene of the video bitstream. The video data processing apparatus 200 may obtain the metadata information mapped to the metadata identification information, from the metadata information database. The metadata information database may be received from the video data generating apparatus 100 via a channel different from a channel via which the video bitstream is received, before the video bitstream is received.

In operation 830, the video data processing apparatus 200 may perform video-processing on the decoded video data among the pictures having the decoding order after the random access point picture, based on the obtained metadata information.

The embodiments of the present invention can be written as computer programs and can be implemented in general-use digital computers that execute the programs using a non-transitory computer-readable recording medium. Examples of the non-transitory computer-readable recording medium include magnetic storage media (e.g., ROM, floppy disks, hard disks, etc.) and optical recording media (e.g., CD-ROMs, or DVDs).

While the present invention has been particularly shown and described with reference to embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the present invention.

The invention claimed is:

1. A coded video data generating method comprising:
coding video data;
generating metadata information, wherein the metadata information comprises information about a scene comprising one or more pictures; and
generating a bitstream of the coded video data, the bitstream comprising the metadata information or metadata identification information corresponding to the metadata information,
wherein the metadata information for the scene is generated with coded video data of a first-decoded picture of the scene from among decodable-leading pictures.

2. The coded video data generating method of claim 1, wherein the generating of the bitstream comprises generating the bitstream by inserting the metadata identification information into a predetermined location in the bitstream.

3. The coded video data generating method of claim 2, further comprising transmitting the bitstream comprising the metadata identification information, and a metadata information database comprising the generated metadata information, via different channels.

4. The coded video data generating method of claim 1, wherein the generating of the bitstream comprises generating the bitstream by inserting the metadata information into a location of a random access point picture and a location of a scene cut of a scene comprising one or more pictures having a decoding order after the random access point picture.

5. The coded video data generating method of claim 4, wherein the generating of the bitstream comprises, if the random access point picture and decodable leading pictures belong to a same scene, generating the bitstream by inserting metadata information of the scene to which the random access point picture and the decodable leading pictures belong, into a location of a first decodable leading picture in a display order.

6. The coded video data generating method of claim 4, wherein the generating of the bitstream comprises, if the random access point picture and decodable leading pictures belong to different scenes, generating the bitstream by inserting metadata information of the scene to which the random access point picture belongs, into a location of the random access point picture, and inserting metadata information of the scene to which the decodable leading pictures belong, into a location of a first decodable leading picture in a display order.

7. The coded video data generating method of claim 4, wherein the location of the scene cut corresponds to a location of a first picture in a display order among pictures belonging to each scene.

8. A coded video data generating apparatus comprising:
a video coder configured to code video data and generate metadata information; and
a bitstream generator configured to generate a bitstream of the coded video data, the bitstream comprising the metadata information or metadata identification information corresponding to the metadata information,
wherein the metadata information comprises information about a scene comprising one or more pictures, and
wherein the metadata information for the scene is generated with coded video data of a first-decoded picture of the scene from among decodable-leading pictures.

9. The coded video data generating apparatus of claim 8, wherein the bitstream generator is further configured to generate the bitstream by inserting the metadata information into a location of a random access point picture and a location of a scene cut of a scene comprising one or more pictures having a decoding order after the random access point picture.

* * * * *